United States Patent
Lyver

(10) Patent No.: US 8,801,042 B1
(45) Date of Patent: Aug. 12, 2014

(54) LEARNING AID

(71) Applicant: Patricia A. Lyver, Myrtle Beach, SC (US)

(72) Inventor: Patricia A. Lyver, Myrtle Beach, SC (US)

(*) Notice: Subject to any disclaimer, the term of this patent is extended or adjusted under 35 U.S.C. 154(b) by 32 days.

(21) Appl. No.: 13/691,798

(22) Filed: Dec. 2, 2012

Related U.S. Application Data

(60) Provisional application No. 61/566,047, filed on Dec. 2, 2011.

(51) Int. Cl.
*B42D 1/00* (2006.01)
*B42D 3/00* (2006.01)

(52) U.S. Cl.
CPC *B42D 1/00* (2013.01); *B42D 1/009* (2013.01); *B42D 3/008* (2013.01)
USPC .................. 281/36; 283/40; 283/64; 434/317

(58) Field of Classification Search
CPC ........... B42D 1/009; B42D 3/008; B42D 1/00
USPC .................................. 434/317; 283/40, 41, 64
See application file for complete search history.

(56) References Cited

U.S. PATENT DOCUMENTS

| | | | |
|---|---|---|---|
| 4,757,580 A | 7/1988 | Wolf | |
| 5,033,964 A | 7/1991 | Phelps | |
| 5,626,365 A | 5/1997 | Petteway | |
| 5,713,743 A * | 2/1998 | Clements | 283/63.1 |
| 6,210,172 B1 | 4/2001 | Clements | |
| 2009/0102178 A1 | 4/2009 | Thompson | |
| 2010/0227525 A1* | 9/2010 | Smith | 281/21.1 |
| 2011/0133441 A1 | 6/2011 | Kaufman | |
| 2012/0146322 A1* | 6/2012 | Erisalu | 283/64 |

* cited by examiner

*Primary Examiner* — Kyle Grabowski
(74) *Attorney, Agent, or Firm* — P. Jeff Martin; The Law Firm of P. Jeffrey Martin, LLC

(57) ABSTRACT

An improved learning aid in the form of a book, the book includes a front cover, a back cover, and a plurality of pages intermediate the front cover and the back cover. The plurality of pages, front cover, and back cover are conventionally bound together along one longitudinal side by a binding means. The back cover includes an outer side disposed with a plurality of sections. Each of the sections printed text framed by a text identification and sequence indicator, wherein the printed text is a complete reproduction of the text printed on a particular numbered page of the plurality of pages of the book.

8 Claims, 3 Drawing Sheets

LEARNING AID

RELATED APPLICATIONS

This application claims priority to U.S. Provisional Patent Application No. 61/566,047, filed on Dec. 2, 2011 and entitled, "Improved Learning Aid". The entire contents of which are herein incorporated by reference.

BACKGROUND OF THE INVENTION

1. Field of the Invention

The present invention relates generally to learning aids and, more particularly, to an improved learning aid in the form of a book having a back cover with text reproduced thereon in an arranged, orderly pattern.

2. Description of the Related Art

Currently there exist in the art various learning aid devices for relating stories to a group of persons. However, the prior art has failed to disclose or teach a learning aid in the form of a book having a back cover with text reproduced thereon in an arranged, orderly pattern.

Accordingly, a need exists for a learning aid in the form of a book which allows children to follow book illustrations coincident to the text as it is recited. The development of the improved learning aid fulfills this need.

A search of the prior art did not disclose any patents that read directly on the claims of the instant invention; however, the following references were considered related:

U.S. Pat. No. 5,033,964, issued in the name of Phelps;
U.S. Pat. No. 5,626,365, issued in the name of Petteway;
U.S. Patent Application no. 2011/0133441 A1, published in the name of Kaufman;
U.S. Patent Application no. 2009/0102178 A1, published in the name of Thompson;
U.S. Pat. No. 6,210,172 B1, issued in the name of Clements; and
U.S. Pat. No. 4,757,580, issued in the name of Wolf.

Consequently, a need has been felt for an improved learning aid the form of a book having a back cover with text reproduced thereon in an arranged, orderly pattern. This application presents claims and embodiments that fulfill a need or needs not yet satisfied by the products, inventions and methods previously or presently available. In particular, the claims and embodiments disclosed herein describe a learning aid comprising a book, the book comprising: a front cover; a back cover; a plurality of pages intermediate the front cover and the back cover, the plurality of pages comprising a first text and illustrations; a binding means for conventionally binding the front cover, the plurality of pages, and the back cover; a plurality of sections comprising a text identification and sequence indicator, the plurality of sections disposed along an outer side of the back cover, the plurality of sections each comprises a second text, wherein the second text is a complete reproduction of the first text, the learning aid providing unanticipated and nonobvious combination of features distinguished from the products, inventions and methods pre-existing in the art. The applicant is unaware of any product, method, disclosure or reference that discloses the features of the claims and embodiments disclosed herein.

SUMMARY OF THE INVENTION

Briefly described according to one embodiment of the present invention, an improved learning aid in the form of a book is disclosed for increasing children's attentiveness by allowing them to follow book illustrations coincident to the text as it is recited, thereby enhancing their reading and learning skills. The improved learning aid comprises a book comprising a front cover, a back cover, and a plurality of pages intermediate the front cover and the back cover. The plurality of pages, front cover, and back cover are conventionally bound together along one longitudinal side by a binding means. The front cover, back cover, and the plurality of pages each include text and illustrations.

The back cover includes an outer side comprising a plurality of sections or boxes. Each of the sections comprises text, wherein the text thereof is a complete reproduction of the text printed on a particular numbered page of the plurality of pages of the book. The sections are sequentially arranged to correspond respectively with the plurality of numbered pages comprising the text bearing the printed literary work or writing portion of the book.

The plurality of sections each further comprises a page identifier which corresponds numerically with a numbered page of the book.

The improved learning aid is adapted and configured to allow children to follow book illustrations coincident to the text as it is recited, thereby increasing children's attentiveness and in turn, enhancing their reading and learning skills.

The book may further comprise a removable article or item which coincides with the storyline or theme of the book.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENT

Detailed Description of the Figures

Figure 1:
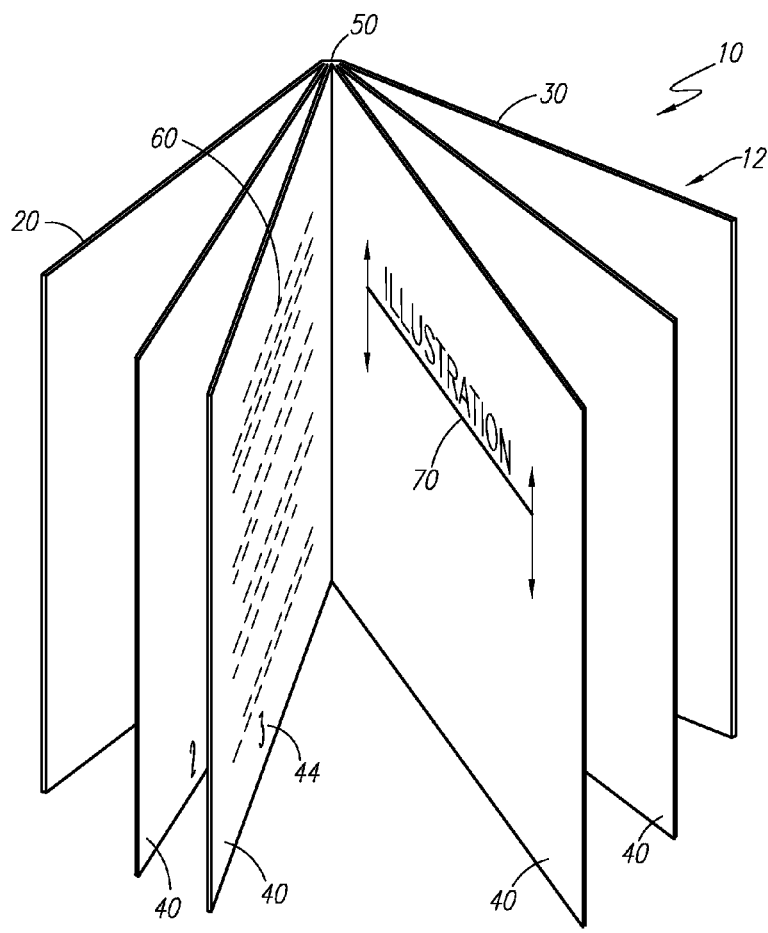
FIG. 1 is a front perspective view of an improved learning aid, according to one embodiment of the present invention.

Referring now to FIGS. 1-4, an improved learning aid 10 is shown, according to one embodiment of the present invention, wherein the improved learning aid 10 is in the form of a book 12 comprising a front cover 20, a back cover 30, and a plurality of pages 40 intermediate the front cover 20 and the back cover 30. The plurality of pages 40, front cover 20, and back cover 30 are conventionally bound together or contiguously along one longitudinal side by a binding means 50 in a manner which facilitates turning of the pages 40. In accordance to one embodiment, binding means 50 comprises a plurality of mechanical fasteners 52, the mechanical fasteners 52 shown herein as staples 53.

In accordance to an alternate embodiment, binding means 50 may comprise a suitable adhesive which is known to those of ordinary skill in the art for effectively binding together a front cover, a plurality of pages, and a back cover of a book.

In accordance to another alternate embodiment, binding means 50 may comprise a spiral member extending through a series of spatially-aligned holes defined through a left side edge of front cover 20, back cover 30, and the plurality of pages 40. Other suitable binding means 50 are envisioned which include, but are not limited to ring binders, stitching, male/female mating binders, and clip binders.

The front cover 20, back cover 30, and plurality of pages 40 may each include text 60 and illustrations 70. Preferably, text 60 and illustrations 70 are each provided intermittently, such as on alternating pages of the plurality of pages 40, as shown in FIGS. 1 and 4.

The book 12 may further comprise front matter 14 and back matter 16. Front matter 14 may include a half title, book card (for listing previous works by author, or books in same series), title page, copyright notice (including other publishing notices), dedication, blank, table of contents, list of illustrations, list of tables, foreword, editor's preface, author's preface, epigraph, acknowledgments, introduction, second half title, and text 60.

Back matter 16 may include appendix(es), notes, glossary, bibliography, list of contributors, index(es), acknowledgments (in the event acknowledgements not provided in front matter 14), and colophon.

Figure 4:
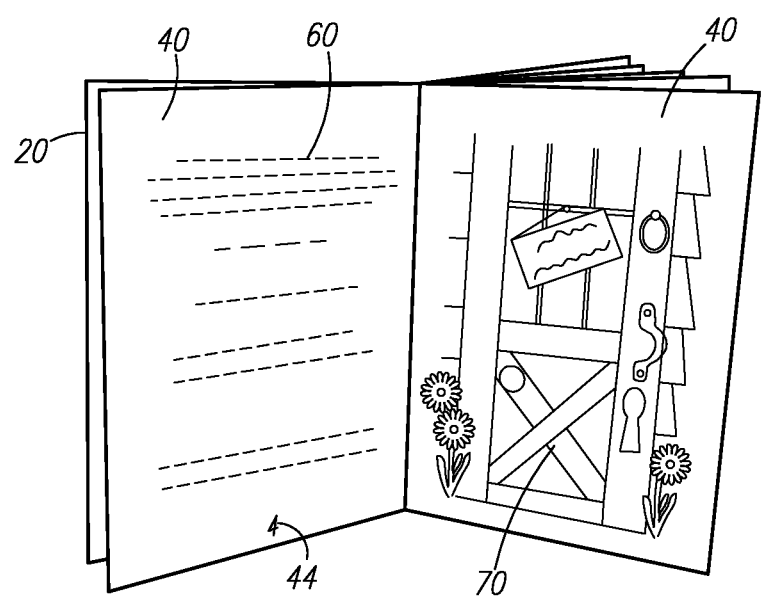
FIG. 4 is a front perspective view of the learning aid showing text and an illustration thereof, according to one embodiment of the present invention.
Figure 5:
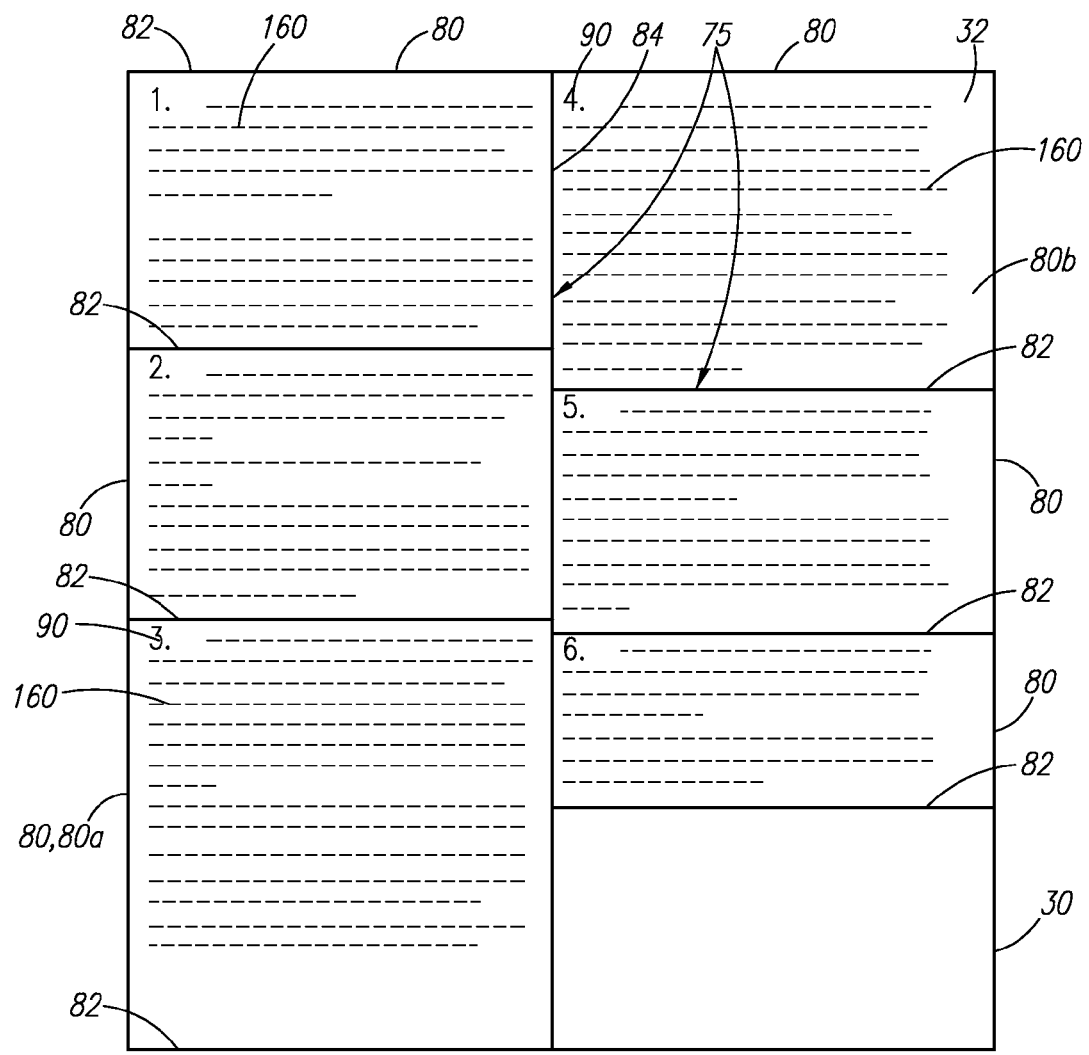
FIG. 5 is a top plan view of the back cover of the learning aid illustrating the plurality of sections disposed thereon, in accordance to one embodiment of the present invention.

Referring now more specifically to FIGS. 1, 4, and 5, the outer side or outer surface 32 of the back cover 30 comprises a plurality of sections 80 or boxes. The plurality of sections 80 affords important, unanticipated and nonobvious functional utility to the present invention as described in detail hereinbelow.

In accordance to one embodiment, the sections 80 are formed by a plurality of horizontal lines 82 and at least one vertical line 84 collectively forming a text identification and sequence indicator 75, the indicator 75 separating, dividing, or otherwise segregating the sections 80 from one another, as particularly illustrated in FIG. 5.

Each section 80 of the plurality of sections 80 comprises text 160, wherein the text 160 thereof is a complete reproduction of the text 60 printed on a particular numbered page 44 of the plurality of pages 40. The text 160 is semi-enclosed or framed by its corresponding section 80. The sections 80 are sequentially arranged to correspond respectively with the plurality of numbered pages 40 comprising the text 60 bearing the printed literary work or writing portion, e.g., short story, rhyme, poetry, and other literary works, historical documents, compositions, and the like. To demonstrate the above-described sequentially-arranged, text reproduction of the text 60 to the outer surface 32 of the back cover 30, in accordance to one exemplary embodiment, attention is directed to FIG. 1, wherein the text 60, shown printed on page "3" on the numbered page 44 of the book 12, is reproduced in its entirety in section 80a, as illustrated in FIG. 5. The text identification and sequence indicator 75 allows the reader of the book 12 to quickly, easily, and efficiently identify and recite the text 160 in the properly successional fashion.

The plurality of sections 80 each further comprises a page identifier 90 which corresponds numerically with a numbered page 44 of the book 12. The page identifier 90 indicates to the reader the particular numbered page 44 of the book 12 reader is vocally reproducing to the listener(s). By way of example, in accordance to the instant exemplary embodiment, section 80a comprises a page identifier 90, shown in FIG. 5 as "3", to indicate to the reader the particular numbered page 44 of the book 12 reader is vocally reproducing or narrating to the listener(s).

In further accordance to the above-described exemplary embodiment, attention is directed to FIG. 4, wherein the text 60, shown printed on page "4" on the numbered page 44 of the book 12, is reproduced in its entirety in section 80b, as illustrated in FIG. 5. Like section 80a, section 80b comprises a page identifier 90, shown in FIG. 5 as "4", to indicate to the reader the particular numbered page 44 of the book 12 reader is vocally reproducing or narrating to the listener(s). The improved learning aid 10 allows the book 12 to be recited to listener(s) while concurrently displaying the illustrations 70 thereof which correspond textually (associated with/coincide with) to the numbered page 44 from which the reader is reciting. The design and configuration of the improved learning aid 10 eliminates turning of the book 12 away from listener(s) during a recitation, and permits continuous visual access by listener(s) to corresponding illustrations 70 during the recitation.

The sequentially-arranged disposition of the plurality of sections 80 on the outer surface 32 of the back cover 30 of the book 12, the sections 80 comprising the second text 160, second text 160 being a complete reproduction of the first text 60, and page identifiers 90 which correspond numerically with the numbered pages 44 of the book 12 so that the second text 160 provided in each section 80 corresponds with the first text 60 printed respectively on the numbered page 44 of the plurality of numbered pages 40, is critical for allowing the reader to recite the book 12 to listener(s) while concurrently displaying the illustrations 70 thereof which correspond textually to the numbered page 44 from which the reader is reciting.

Significantly, the first text 60 of the book 12 was optimized by applicant which resulted in the achievement of unexpected good results; wherein the unexpected good results being the allowance by a reader of the book 12 of the learning aid 10 to be recited to listener(s) while concurrently displaying the illustrations 70 thereof which correspond textually to the numbered page 44 from which the reader is reciting. Further, the development of the plurality of sections 80 as described herein eliminates turning of the book 12 away from listener(s) or listening audience during a recitation, and thus permits continuous visual access by the listener(s) to corresponding illustrations 70 during said recitation.

The first text 60 was optimized by disposing a complete reproduction of the first text 60 (described and shown herein as the second text 160) onto the outer surface 32 of the back cover 30 of the book 12 in the sequentially-arranged manner as previously described. Further, the development of the plurality of sections 80 as described herein eliminates turning of the book 12 away from listener(s) or listening audience during a recitation, as is commonly practiced by readers of a conventional book to an audience in order to locate the succeeding page of text to recite. Consequently, the plurality of sections 80 also permit continuous visual access by the listener(s) to corresponding illustrations 70 during said recitation.

The improved learning aid 10 possesses unanticipated and nonobvious combination of features and elements which are distinguished from the products, inventions, devices, and methods preexisting in the art. The improved learning aid 10 allows children to follow book illustrations 70 which correspond to the text 60 as the text 160 is read, thereby increasing children's attentiveness and in turn, enhancing their reading and learning skills.

Figure 2:
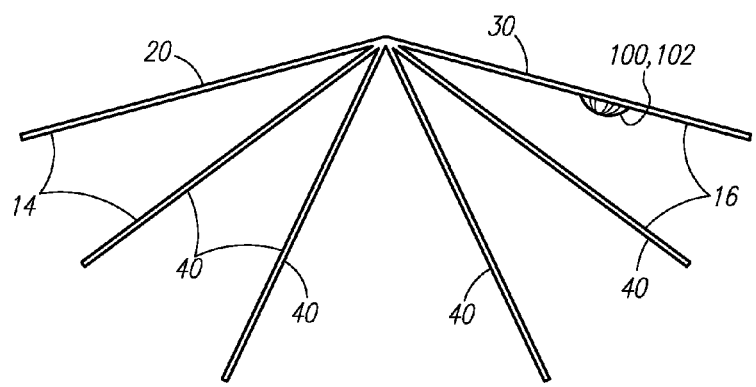
FIG. 2 is a top end view of the learning aid of FIG. 1.
Figure 3:
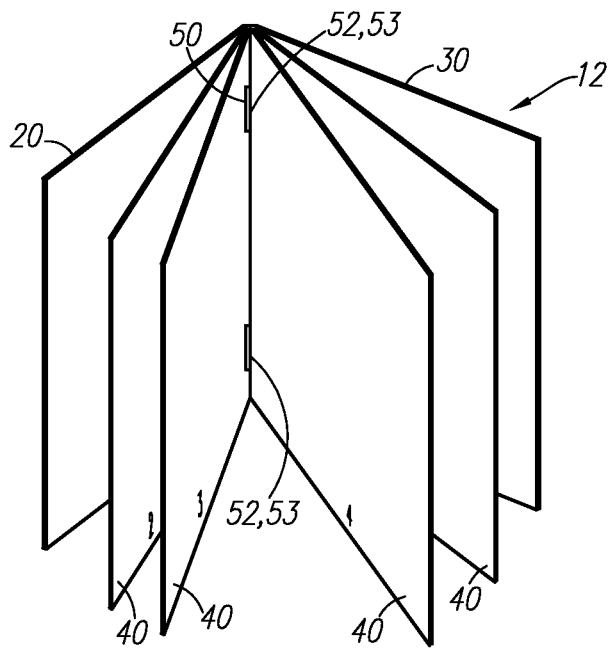
FIG. 3 is a front perspective view of the learning aid illustrating the binding means, in accordance to one embodiment of the present invention.

Finally, in reference to FIG. 2, the book 12 further comprises a removably affixed article 100 or item which coincides with the storyline or theme of the book 12. The article 100 may be suitably affixed to a desired portion of the book 12 or constrained via an integral pocket, recess, fastener, clip, or other suitable method for holding or constraining the article 100 until removal is desired. In accordance to one embodiment of the present invention, the article 100 comprises a seashell 102.

It is envisioned that the various embodiments, as separately disclosed, are interchangeable in various aspects, so that elements of one embodiment may be incorporated into one or more of the other embodiments, and that specific positioning of individual elements may necessitate other arrangements not specifically disclosed to accommodate performance requirements or spatial considerations.

It is to be understood that the embodiments and claims are not limited in its application to the details of construction and arrangement of the components set forth in the description and illustrated in the drawings. Rather, the description and the drawings provide examples of the embodiments envisioned, but the claims are limited to the specific embodiments. The embodiments and claims disclosed herein are further capable of other embodiments and of being practiced and carried out in various ways. Also, it is to be understood that the phraseology and terminology employed herein are for the purposes of description and should not be regarded as limiting the claims.

Accordingly, those skilled in the art will appreciate that the conception upon which the application and claims are based may be readily utilized as a basis for the design of other structures, methods, and systems for carrying out the several purposes of the embodiments and claims presented in this application. It is important, therefore, that the claims be regarded as including such equivalent constructions.

Furthermore, the purpose of the foregoing Abstract is to enable the U.S. Patent and Trademark Office and the public generally, and especially including the practitioners in the art who are not familiar with patent and legal terms or phraseology, to determine quickly from a cursory inspection the nature and essence of the technical disclosure of the application. The Abstract is neither intended to define the claims of the application, nor is it intended to be limiting to the scope of the claims in any way. It is intended that the application is defined by the claims appended hereto.

What is claimed is:

1. A learning aid comprising:
    a book, the book comprising:
        a front cover;
        a back cover;
        a plurality of pages intermediate the front cover and the back cover, the plurality of pages comprising a first text and a plurality of illustrations, the first text and the plurality of illustrations are each provided on the plurality of pages in an intermittent fashion, and wherein the first text and the plurality of illustrations are each provided, respectively, on alternating pages of the plurality of pages;
        a means for binding the front cover, the plurality of pages, and the back cover contiguously along one longitudinal side of the book, the means for binding the front cover, the plurality of pages, and the back cover comprises at least one of a plurality of mechanical fasteners and a suitable adhesive; and
        a plurality of sections disposed along an outer surface of the back cover, the plurality of sections comprises a plurality of horizontal lines and at least one vertical line, wherein the plurality of horizontal lines and the at least one vertical line collectively comprises a text identification and sequence indicator, and wherein two or more sections of the plurality of sections further comprises a second text, wherein the second text comprises a complete reproduction of the first text.

2. The learning aid of claim 1, wherein two or more sections of the plurality of sections comprises a page identifier.

3. The learning aid of claim 1, wherein each of the sections of the plurality of sections are sequentially arranged to correspond respectively with a plurality of numbered pages comprising the first text, the first text bearing a printed literary work or a writing portion of the book, thereby allowing children to follow the illustrations of the book, the illustrations correspond to the first text as the second text is read, thereby increasing children's attentiveness and in turn, enhancing their reading and learning skills.

4. The learning aid of claim 1, wherein the book further comprises an article or item removably secured thereto, the article or item coincides with the storyline or theme of the book.

5. A learning device comprising:
    a book, the book comprising:
        a front cover;
        a back cover;
        front matter;
        back matter;
        a plurality of pages intermediate the front cover and the back cover, the plurality of pages comprising a first text and a plurality of illustrations, the first text and the plurality of illustrations are each provided on the plurality of pages in an intermittent fashion, wherein the first text and the plurality of illustrations are each provided, respectively, on alternating pages of the plurality of pages;
        a means for binding the front cover, the plurality of pages, and the back cover contiguously along one longitudinal side of the book; and
        a plurality of sections disposed along an outer surface of the back cover, the plurality of sections comprises:
            a plurality of horizontal lines;
            at least one vertical line, the plurality of horizontal lines and the at least one vertical line collectively comprises a text identification and sequence indicator;
            a second text, the second text comprises a complete reproduction of the first text; and
            a page identifier.

6. The learning device of claim 5, wherein each of the sections of the plurality of sections are sequentially arranged to correspond respectively with a plurality of numbered pages comprising the first text, the first text bearing a printed literary work or a writing portion of the book, thereby allowing children to follow the illustrations of the book, the illustrations correspond to the first text as the second text is read, thereby increasing children's attentiveness and in turn, enhancing their reading and learning skills.

7. The learning device of 5, wherein the book further comprises an article or item removably secured thereto, the article or item coincides with the storyline or theme of the book.

8. The learning device of claim 7, wherein the article comprises a seashell.

* * * * *